(12) United States Patent
Webb (10) Patent No.: US 7,350,500 B1
(45) Date of Patent: Apr. 1, 2008

(54) INVERTED CARDIOID ENGINE

(76) Inventor: David W. Webb, 412 S. River St., Newberg, OR (US) 97132

( * ) Notice: Subject to any disclaimer, the term of this patent is extended or adjusted under 35 U.S.C. 154(b) by 0 days.

(21) Appl. No.: 11/497,940

(22) Filed: Aug. 1, 2006

Related U.S. Application Data (63) Continuation-in-part of application No. 11/361,235, filed on Feb. 24, 2006, now Pat. No. 7,281,513.

(51) Int. Cl.
*F02B 53/00* (2006.01)
*F02B 53/12* (2006.01)

(52) U.S. Cl. .............. 123/200; 123/210; 123/211; 418/61.2

(58) Field of Classification Search .......... 123/200, 123/210, 211, 218, 228, 229; 418/61.2, 34
See application file for complete search history.

(56) References Cited

U.S. PATENT DOCUMENTS

| | | | |
|---|---|---|---|
| 553,086 A | 1/1896 | Wheildon | |
| 1,310,157 A | 7/1919 | De Campo | |
| 1,340,625 A | 5/1920 | Planche | |
| 1,636,486 A | 7/1927 | Planche | |
| 1,802,887 A | 4/1931 | Feyens | |
| 2,988,065 A * | 6/1961 | Wankel et al. | 418/61.2 |
| 3,117,561 A | 1/1964 | Bonavera | |
| 3,226,013 A | 12/1965 | Toyoda et al. | |
| 3,299,822 A | 1/1967 | Payne | |
| 3,310,042 A * | 3/1967 | Haas | 123/205 |
| 3,480,203 A | 11/1969 | Koch | |
| 3,636,930 A | 1/1972 | Okada | |
| 3,690,791 A | 9/1972 | Dieter | |
| 3,744,941 A * | 7/1973 | Nestor | 418/61.2 |
| 3,762,377 A * | 10/1973 | Anthony et al. | 123/211 |
| 3,800,760 A | 4/1974 | Knee | |
| 3,952,708 A * | 4/1976 | Burley | 123/211 |
| 3,987,758 A * | 10/1976 | Wankel | 123/210 |
| 4,015,441 A * | 4/1977 | Robinet | 62/402 |
| 4,095,564 A * | 6/1978 | Hochstein | 123/211 |
| 5,375,985 A * | 12/1994 | Pipaloff | 418/6 |
| 5,855,474 A * | 1/1999 | Shouman | 418/6 |

FOREIGN PATENT DOCUMENTS

JP          63192901 A   *   8/1988

OTHER PUBLICATIONS

U.S. Appl. No. 11/361,235, filed Feb. 24, 2006, David Webb.

* cited by examiner

*Primary Examiner*—Thomas Denion
*Assistant Examiner*—Mary A Davis
(74) *Attorney, Agent, or Firm*—Timothy E. Siegel (57) ABSTRACT

An internal combustion engine comprising a support structure, including a tube and a hollow stator core, supported by and rigidly affixed to the tube. Additionally, a rotor assembly is eccentrically and rotatably mounted about the stator core and having a pair of partial sidewalls, each of which defines a circular opening. A pair of shaft seals, in which each shaft seal is set into one of the circular openings and are rotatably mounted about the tube. The stator core, rotor and shaft seals together define multiple, separate sealed chambers that change volume as the rotor moves. Finally, ignition, intake and exhaust mechanisms are mounted internal to the hollow stator core.

17 Claims, 9 Drawing Sheets

INVERTED CARDIOID ENGINE

RELATED APPLICATION

This application is a continuation-in-part of application Ser. No. 11/361,235 filed Feb. 24, 2006 now U.S. Pat. No. 7,281,513.

BACKGROUND OF THE INVENTION

This application is a continuation-in-part and incorporates by reference the content of the patent application for the "Inverted Wankel" (application Ser. No. 11/361,235 by Webb, henceforth "the '235 application"). The '235 application discloses an engine that is an inversion of the standard Wankel rotary engine. In the engine of the '235 application, the stator has a "constant-width" geometry: it always appears to be the same width when viewed from any angle. The particular constant-width shape of the '235 application is the same as that used as a rotor in production rotary engines and is based on a Reuleaux triangle, named for the French mathematician who formally described it. In the '235 application, the rotor, stator and shaft seals define a chamber having epitrochoidal geometry, so that regions of gas in the engine housing may undergo compression and ignition as a result of the rotor motion.

Although the Inverted Wankel engine disclosed in the '235 application represents a significant advancement in the art, and may open up new fields of application for the Wankel engine, it includes some mechanical complexity that may drive up the cost of manufacture. Also, the minimum size and weight of an engine made according to the '235 application disclosure may be greater than would be desirable for some applications.

SUMMARY

The following embodiments and aspects thereof are described and illustrated in conjunction with systems, tools and methods which are meant to be exemplary and illustrative, rather than limiting in scope. In various embodiments, one or more of the above-described problems have been reduced or eliminated, while other embodiments are directed to other improvements.

In a first, separate aspect, the present invention may take the form of an internal combustion engine comprising a support structure, including a tube and a hollow stator core, supported by and rigidly affixed to the tube. Additionally, a rotor assembly is eccentrically and rotatably mounted about the stator core and having a pair of partial sidewalls, each of which defines a circular opening. A pair of shaft seals, each of which is set into one of the circular openings and is rotatably mounted about the tube. The stator core, rotor and shaft seals together define two, separate sealed chambers that change volume as the rotor moves. Finally, ignition, intake and exhaust mechanisms are mounted internal to the hollow stator core.

In a second separate aspect, the present invention may take the form of an internal combustion engine comprising support structure means, including tube means and stator core means, supported by and rigidly affixed to the tube means. Rotor means are eccentrically and rotatably mounted about the stator core means and have a pair of partial sidewall means, defining a circular opening. A pair of shaft seal means, each of which is set into one of the circular openings and are rotatably mounted about the tube means. The stator core means, rotor means and shaft seal means together defining two chambers that change volume as the rotor means moves, the chambers being combustion chambers. Finally, ignition, intake and exhaust means are mounted internal to the hollow stator core means.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF THE PREFERRED EMBODIMENTS

In a preferred embodiment, the present invention takes the form of a cardioid engine. In broad, general terms the cardioid engine results from a cost reduction and simplification of the Inverted Wankel of the '235 application. It appears that the least-complicated constant-width solid that can achieve variable compression is three-sided, and interacts with a two-lobe epitrochoid enclosure. To reduce the cost of this design, the '235 application constant width stator is replaced by a "two-sided" stator core (that is no longer a "constant-width" shape), while a lobe is removed from the '235 application two-lobed epitrochoid, causing it to degenerate into a cardioid. The outermost ends of the stator core seal against the interior boundary of the cardioid rotor to create two chambers of varying volume. The resulting engine requires only two intake valves, exhaust valves and spark plugs. The engine of the '235 application, in contrast, requires three of each.

Figure 2:
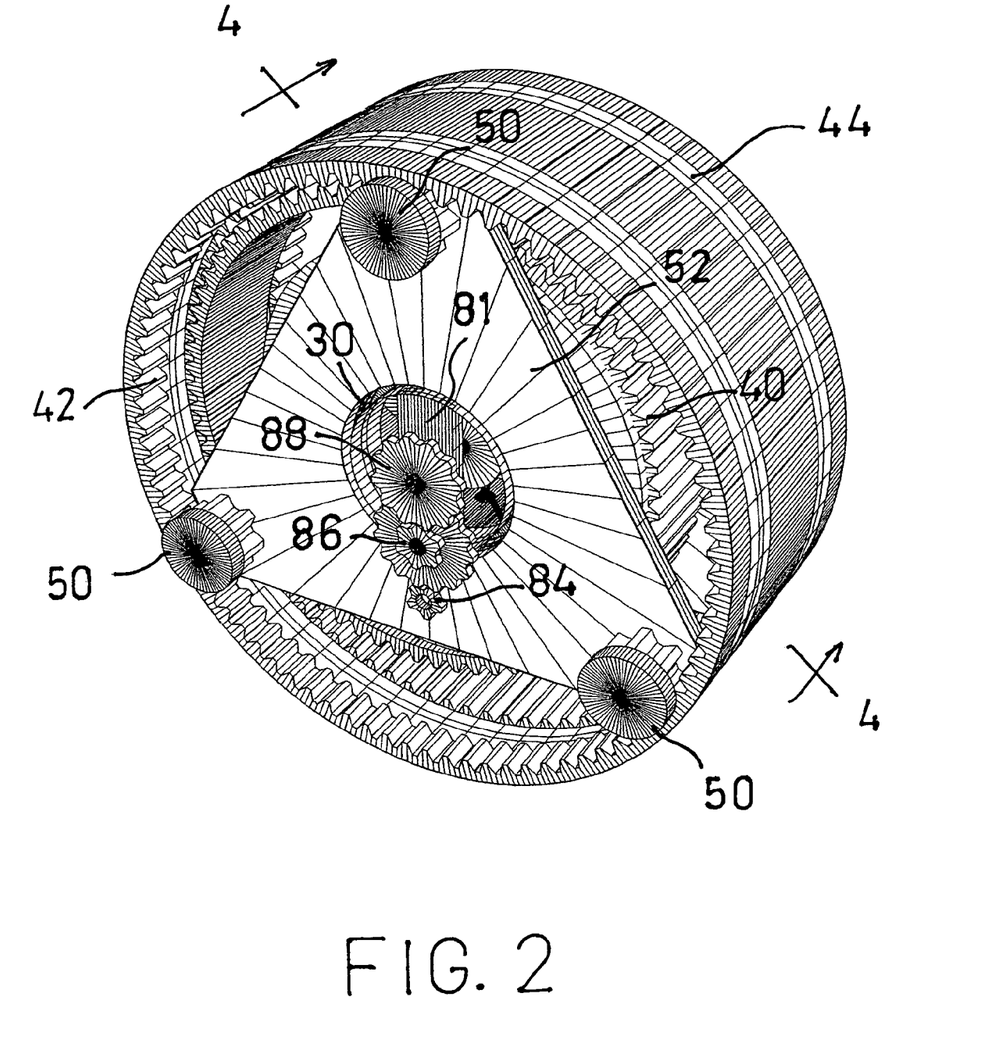
FIG. 2 is a side-top perspective view of the outboard side of an inverted rotary engine, according to the present invention.
Figure 3:
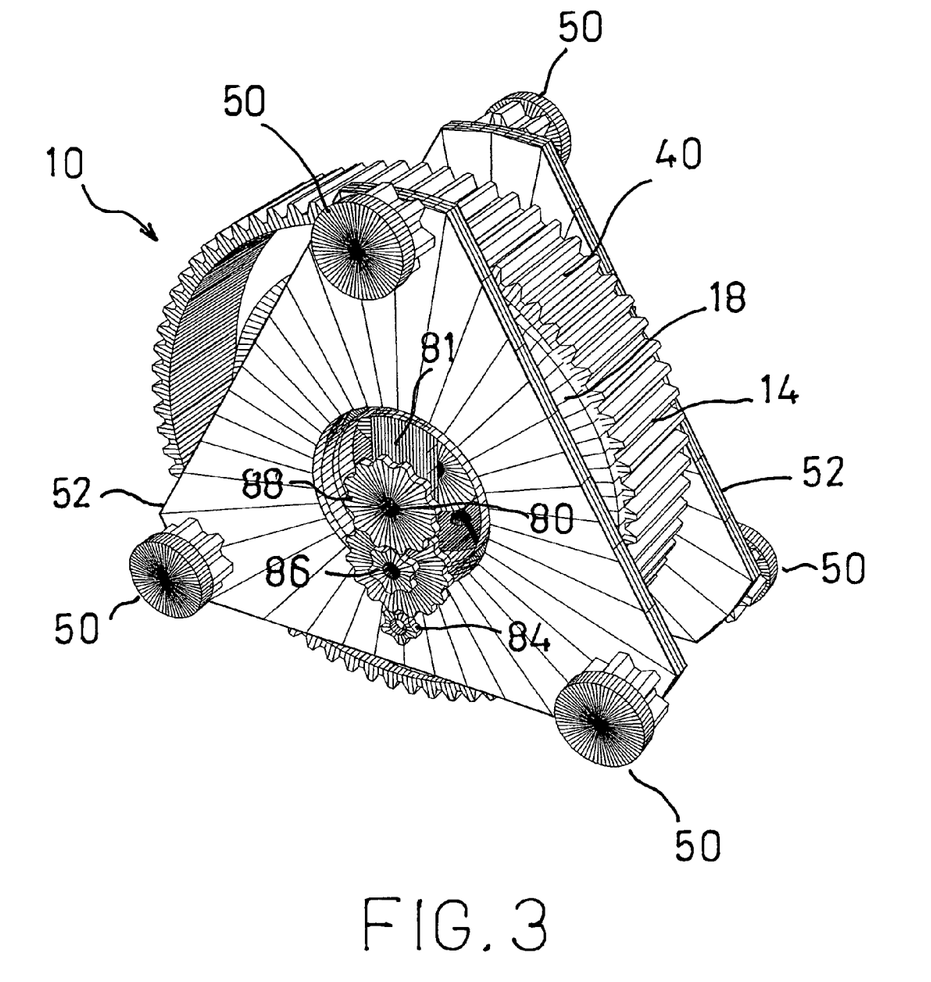
FIG. 3 is a side-top perspective view of the engine of FIG. 2, with the exterior power band removed.
Figure 6:
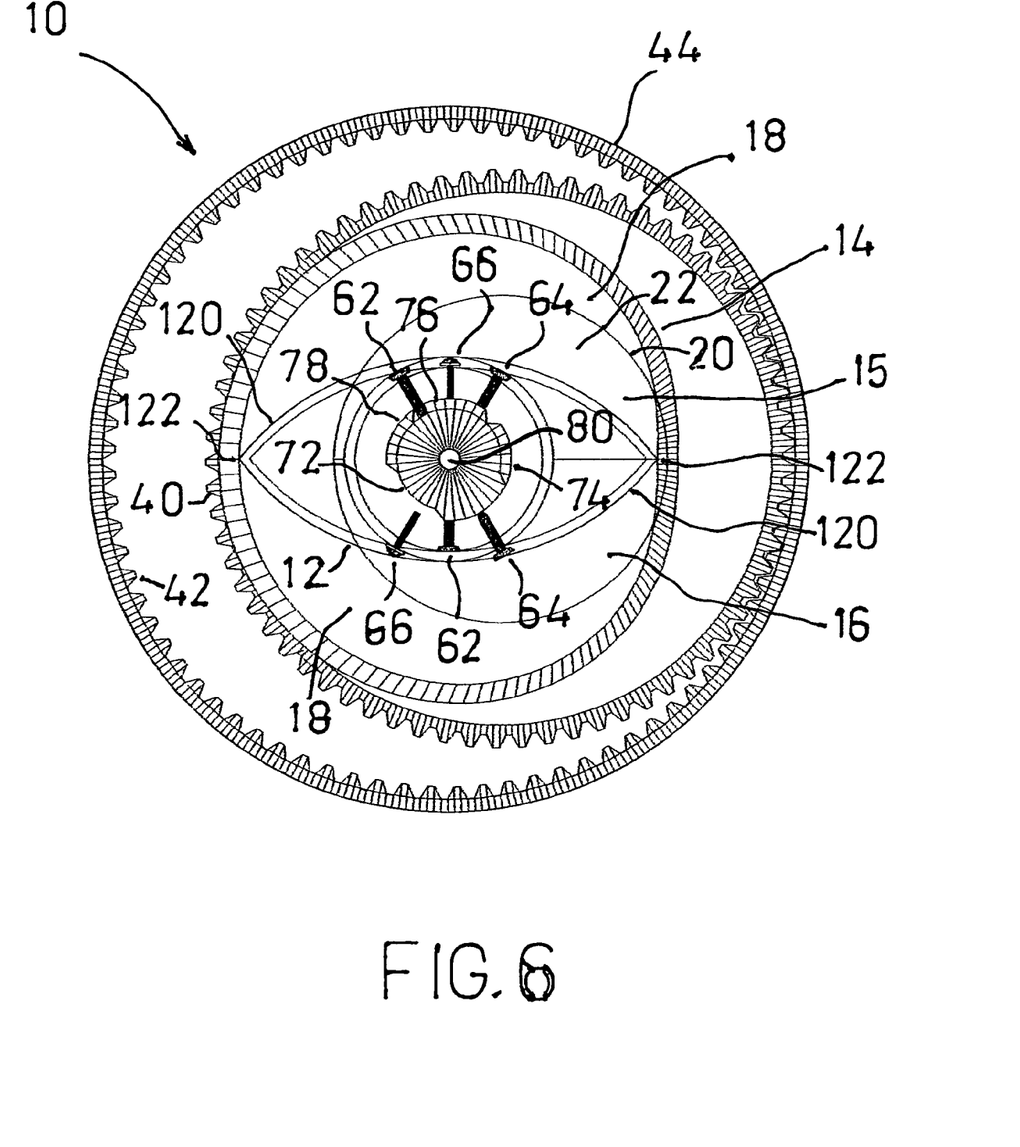
FIG. 6 is a side cut-away sectional view of the components of FIG. 3, taken along line 4-4 of FIG. 2.

Referring first to FIG. 6, in an inverted cardioid rotary engine 10 a stator core 12 has two bounding curved surfaces 120, joined at two acute angles 122. Also, a rotor 14 has a radially inward facing surface of cardioid shape. The rotor also includes a pair of partial sidewalls 18 that each define a circular opening 20. A circular shaft seal 22 is rotatably and sealingly mounted in each opening 20 and rotatably mounted about a support tube 30 (FIG. 2). The stator core 12, the rotor 14 and the pair of shaft seals 22 together define a set of two combustion chambers 15 and 16.

The rotor 14 is driven about the stator 12 by a sequence of explosions that cause the rotor 14 to both translate and rotate. This series of translational and rotational movements moves the position of openings 20, thereby forcing the seals 22 to rotate in an eccentric path about the support tube 30 (FIG. 1), in a direction opposite to the rotational direction of the rotor 14 and at the same rotational velocity.

Figure 1:
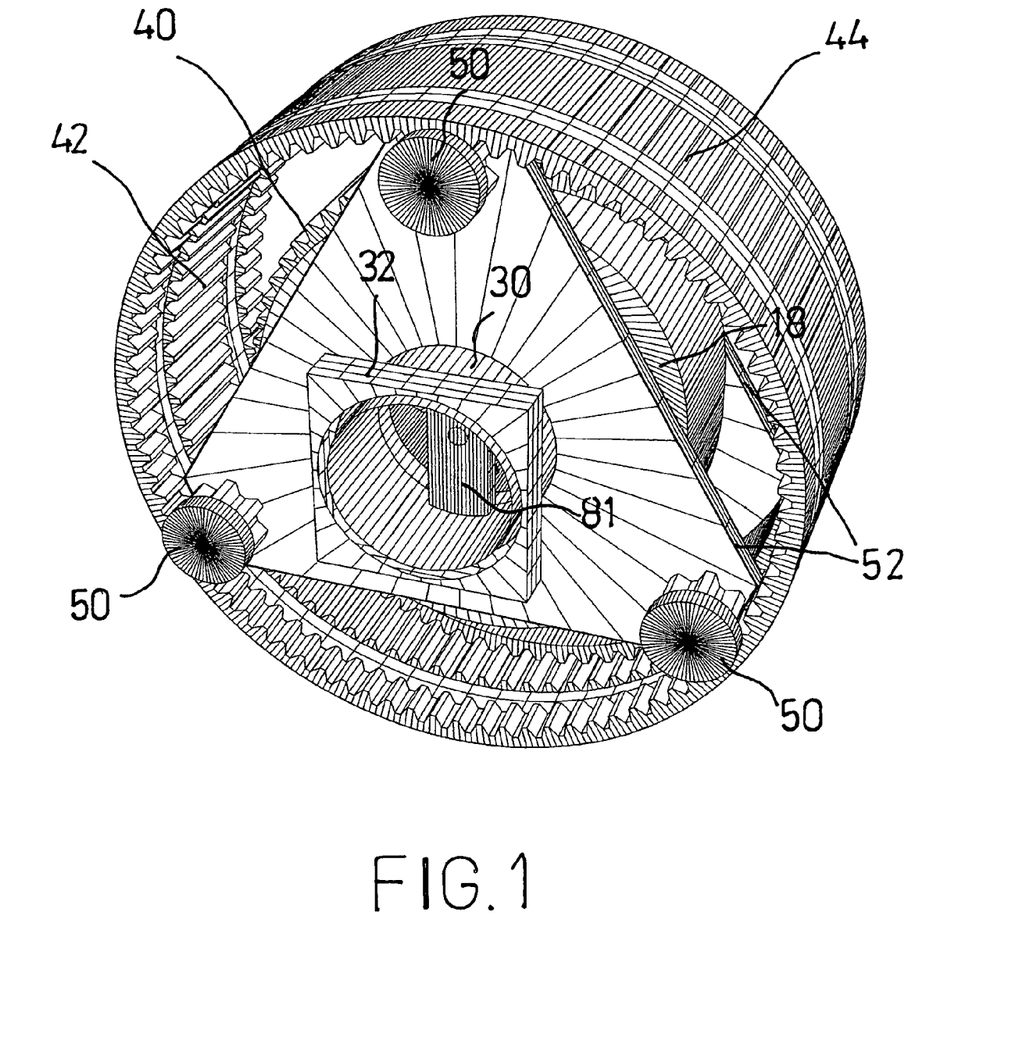
FIG. 1 is a side-top perspective view of the inboard side of an inverted rotary engine, according to the present invention.

Because explosive compression occurs between the rotor 14 and the stator core 12, stator core 12 must be firmly anchored. Core 12 is rigidly supported on its interior by the core tube 30, which extends laterally to be firmly anchored in the engine mount 32 as seen in FIG. 1. The radially outer surface of rotor 14 defines a set of teeth 40, a portion of which are always engaged with a set of inwardly facing teeth 42 of a surrounding power band 44.

Referring to FIG. 1, a set of pinions 50 all rotatably mounted on a triangular pinion support 52, constrains band 44, permitting it to revolve symmetrically about the center of core 12 (FIG. 6), more slowly but in the same direction as rotor 14 (FIG. 6). The pinions 50 are external to the rotor 14, but are still internal to the power band 44, leaving its outer circumference unencumbered and available to drive a circumferential load. In an alternative preferred embodiment, pinions 50 are laterally extended beyond the ends of the power band 44 to provide additional means of utilizing power from the engine. Pinion supports 52 are mounted onto tube 30.

Referring again to FIG. 6, to create and facilitate a driving series of combustions, a set of two intake ports 62, two exhaust ports 64, and two spark plugs 66 reside in the stator core 12. There are a total of four cams 72, 74, 76 and 78 on the cam shaft, each of which may actuate a valve or spark plug in either the upper or the lower chamber 16. A first cam 72 alternately actuates the upper chamber 15 intake and the lower chamber 16 exhaust valves. A second cam 74 actuates the lower chamber 16 intake valve. A third cam 76 actuates the upper chamber 15 spark plug. A fourth cam 78 actuates the upper chamber 15 exhaust and the lower chamber 16 spark plug. A cam shaft 80 runs through the center of the core 12, and supports and drives the cams.

Figure 4:
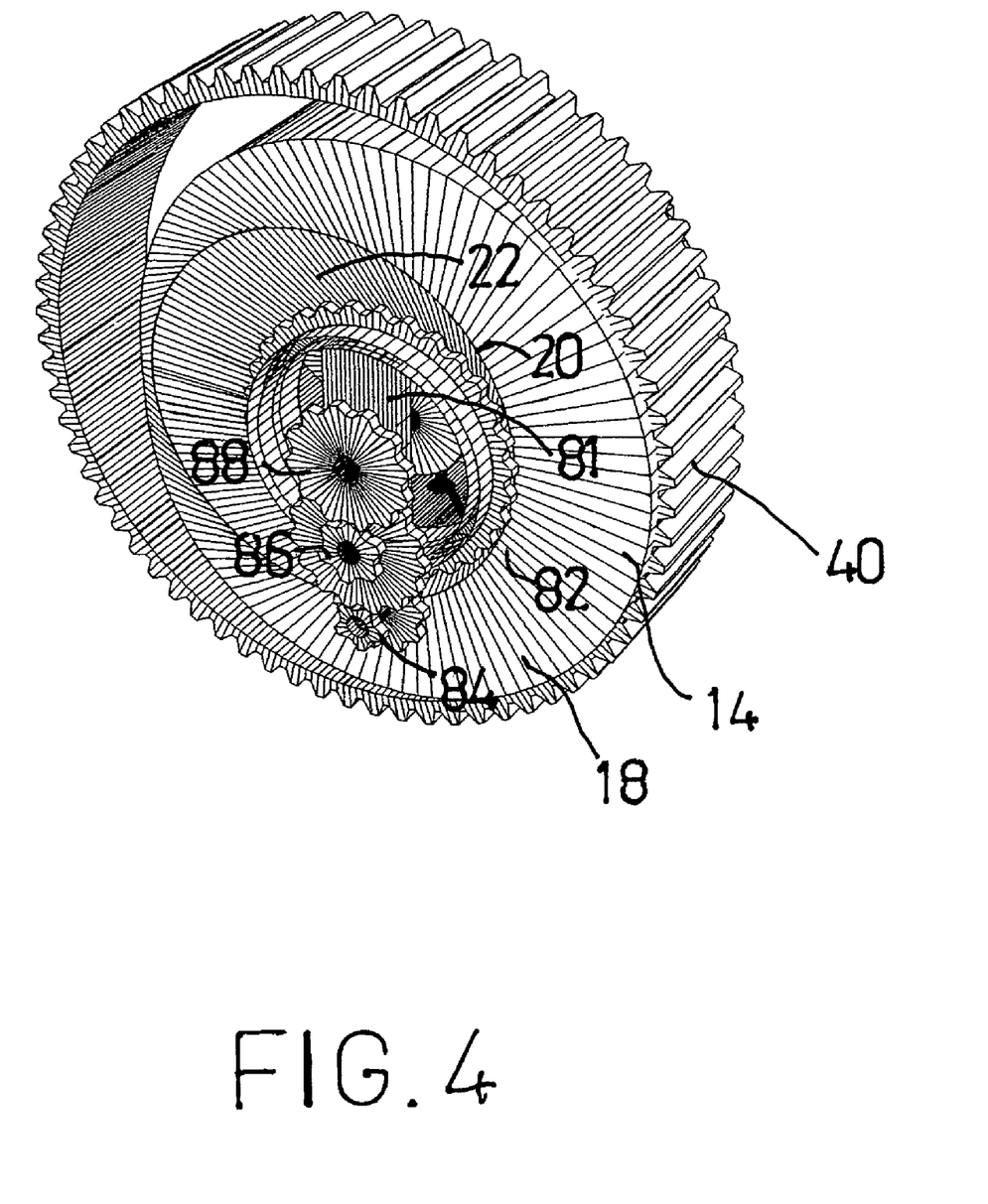
FIG. 4 is a side-top perspective view of the engine of FIG. 2, with the power band, pinion mounts and pinions removed.
Figure 5:
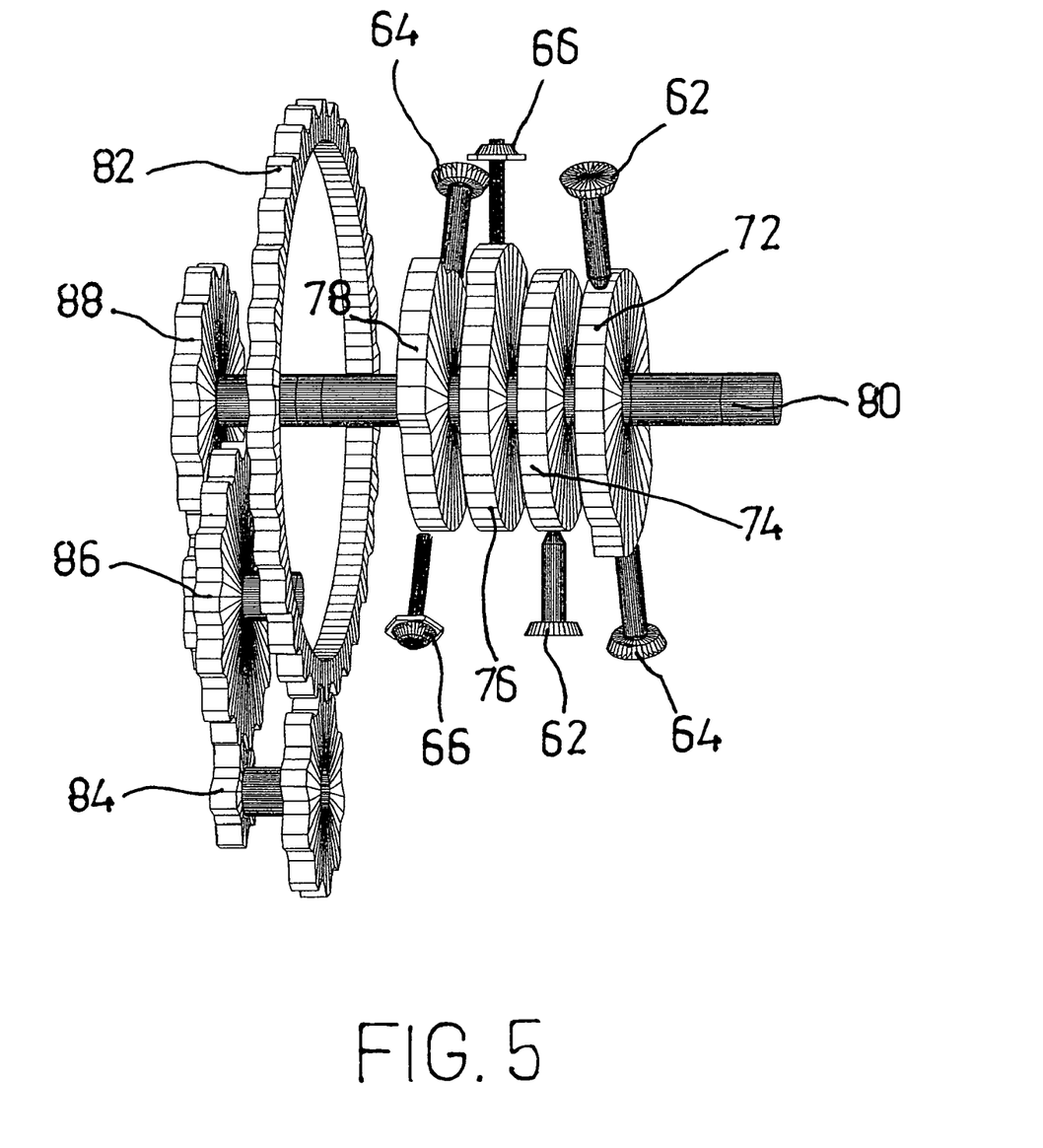
FIG. 5 is a side perspective of the cam driver mechanism, camshaft, cams, valves and spark plugs.

Referring now to FIG. 5, a cam shaft 80, to which cams 72, 74, 76 and 78 are mounted is driven by a gear train that is driven by the motion of a set of teeth 82 on the exterior of shaft seal 22 (FIG. 4) and turns cam shaft 80 at one-half the rotational velocity as the rotor 14 (FIG. 6). More specifically, a first step down gear 84 meshes with teeth 82 and drives a second step down gear 86, mounted on the laterally exterior side of pinion support 52 (FIG. 1). Gear 86, in turn, drives cog 88, to which shaft 80 is rigidly mounted. The gear ratios are listed in Table 1. The cam shaft 80 is supported by cam shaft supports 81 (FIG. 1) within each end of the supporting tube, and may be extended in either direction beyond the end of the engine, perhaps for an application that needs to be synchronized with the rotor position, or simply as an additional means of harnessing the engine's power.

TABLE 1

| GEAR (NUMBER) | RADIUS | ANGULAR VELOCITY |
| --- | --- | --- |
| Cam driver gear (82) | 6 | x |
| Inner cam transfer gear (84) | 2 | −3x |
| Outer cam transfer gear (84) | 1 | −3x |
| Inner cam stepdown gear (86) | 3 | x |
| Outer cam stepdown gear (86) | 1.333 . . . | x |
| Cam shaft gear (88) | 2.666 . . . | −x/2 |

Figure 7:
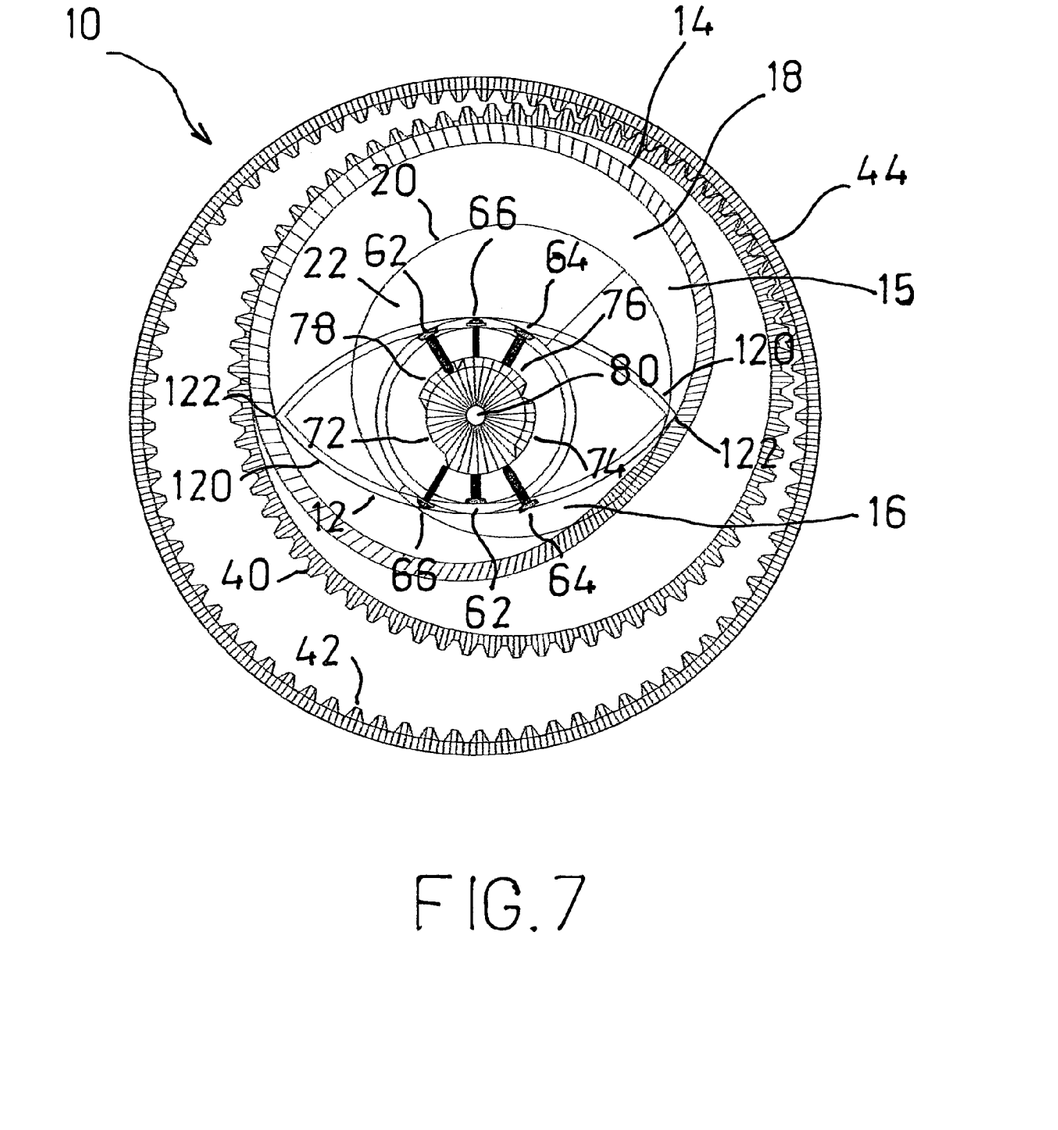
FIG. 7 is a side view of the components of FIG. 3, showing the rotor in a second position.
Figure 8:
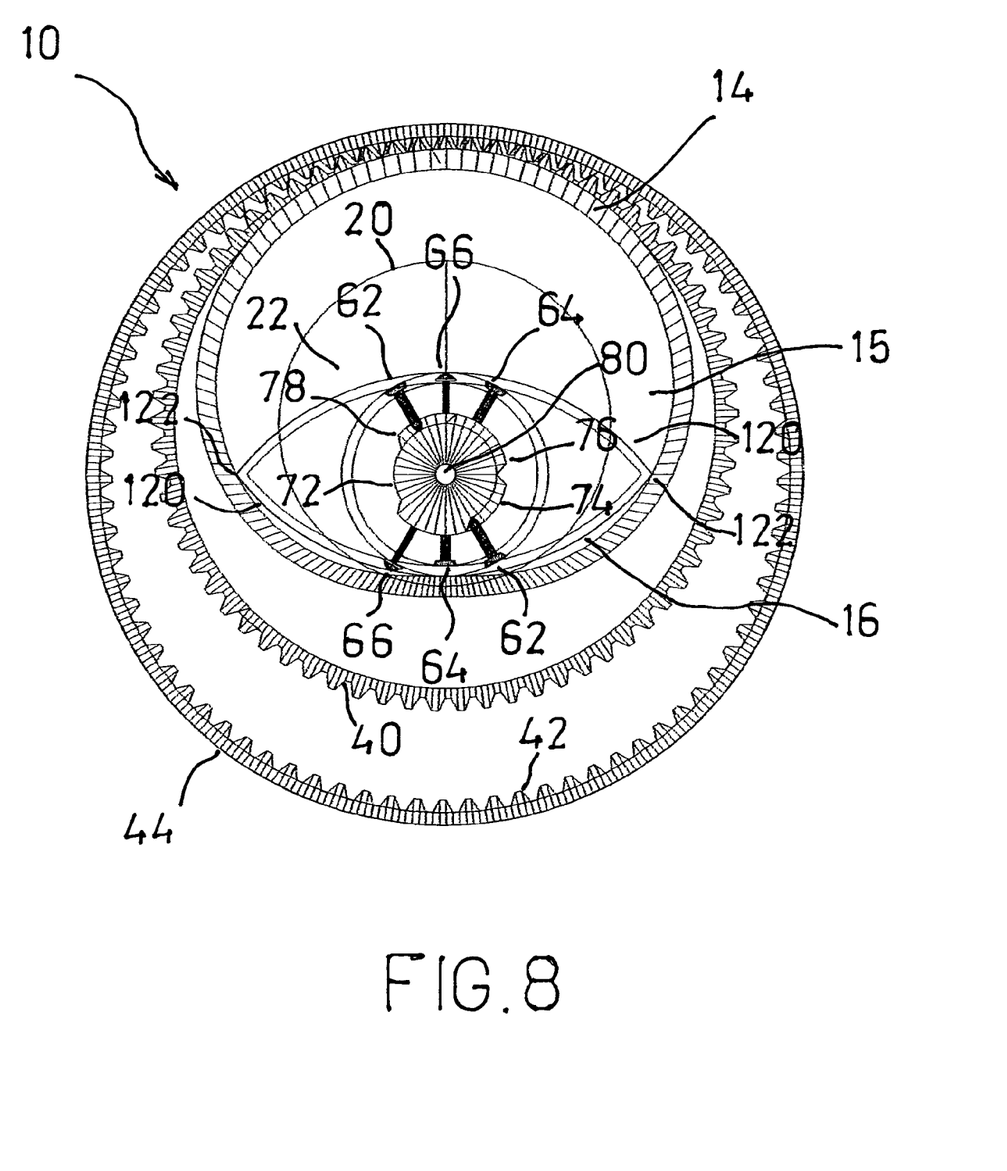
FIG. 8 is a side view of the components of FIG. 3, showing the rotor in a third position.

FIGS. 6, 7 and 8 show three instants in time of the operation of the engine 10. A first phase in the operation of engine 10 is shown in FIG. 6. At this instant, the stator core is spanning the minor axis of the cardioid rotor, dividing the rotor into upper and lower chambers of equal size. As the rotor rotates clockwise, the upper chamber 15 increases in volume and the lower chamber 16 decreases in volume. FIG. 7 illustrates the major axis of the rotor having inclined by 45 degrees, with the gasoline and air mixture in upper chamber 15 having been recently ignited by a sparkplug 66 of upper chamber 15. Also during this phase, lower chamber 16 is expelling exhaust through an exhaust port 64. Referring to FIG. 8, at a later instant the upper chamber 15 has reached its maximum volume and is entering its exhaust phase. The lower chamber 16 is at its minimum volume and is entering its intake phase. The explosion of fuel in upper chamber 15 has forced rotor 14 to rotate clockwise and to translate upward. This action forces the shaft seal 22 to rotate counterclockwise as shown, driven by the partial sidewalls of rotor 14. The same sequence of operations is occurring in chamber 16.

Figure 9:
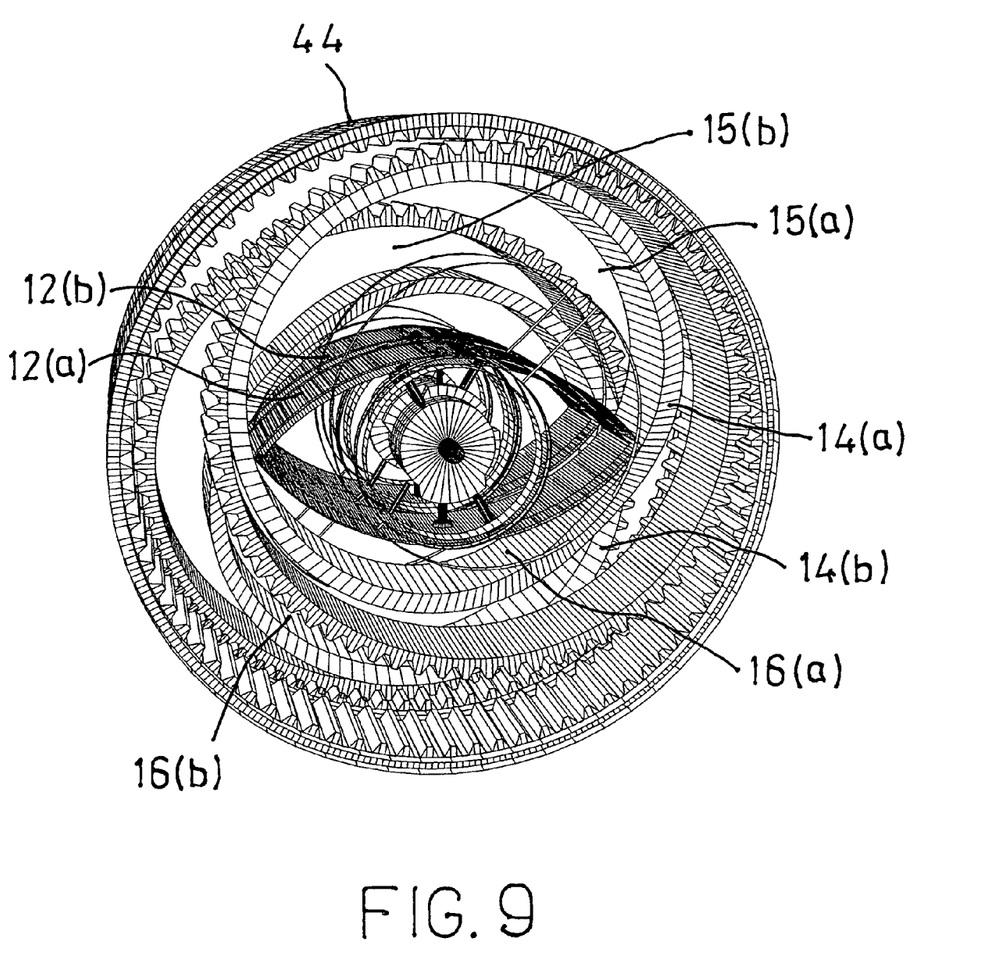
FIG. 9 is a perspective view of an alternative preferred embodiment, in which two rotors are teamed together sharing a common cam driver mechanism.

FIG. 9 shows a version in which two rotors are joined together to form a multirotor engine sharing a single cam driver assembly. The multi-rotor engine is shown without engine mounts: like the Inverted Wankel of the '235 application, either axial or radial mounts may be used to affix the engine to a vehicle.

THEORY OF OPERATION

The operation of an inverted rotary internal combustion engine depends on maintaining specific proportions between an internal stator and an enclosing hollow rotor having an internal surface of epitrochoid shape. A simple stator to produce is a "Reuleaux triangle", commonly used as the rotor for a Wankel engine. If one side is removed from the Reuleaux triangle, the resulting stator is bound by only two curved surfaces. These curved surfaces meet at the ends of their arcs to support apex seals that travel against the inner surface of the enclosing rotor.

The inner surface of the surrounding rotor should define one fewer lobe than the number of "sides" in the stator. The one-lobed epitrochoid shape that results is a "cardioid" form, so named for being "heart-shaped".

An epitrochoid shape is created by rolling a circle of radius (RR) around a stationary circle of (RS) and tracing the path of a follower point that is at distance (RF) from the center of the rolling circle, where RF<RR. Because a single-lobe epitrochoid is required, the rolling circle must complete a rotation on each revolution around the static circle, so RR=RS. The follower radius may be somewhat arbitrary. However, if RF is chosen to be greater than (RR/2), there will be a convex neighborhood on the interior of the cardioid that will cause the cardioid to look truly "heart-shaped". This inflection point must traverse the end seals of the stator while the rotor is turning, so it is good to minimize the degree of convexity.

This degree of convexity also influences the attainable compression ratio of the engine. The cardioid engine in the illustrations uses RF=(RR/2).

Given these choices for RS, RR and RF, the distance of the boundary point nearest to the center of the cardioid is $$RS+RR-RF,$$

and the distance of the boundary point farthest from the center of the cardioid is $RS+RR+RF.$ A line connecting these points is defined to be the minor axis of the cardioid, and its length LMINOR is $$LMINOR = (RS + RR - RF) + (RS + RR + RF)$$
$$= 2*(RS + RR)$$

This distance must be spanned by the stator core when the rotor's inflection point is making the transition across one end of the stator. Therefore, the cross-sectional "length" of the major axis of the stator, also the distance between the endpoints of the arcs, is $LSTATOR=2*(RS+RR).$ The cross-sectional "width" or thickness of the stator is measured along the minor axis of the stator. (In the illustrated embodiment, the stator is oriented so that the major axis is horizontal and the major axis is oriented vertically.) The maximum thickness of the stator is dictated by the geometry of the enclosing cardioid. As noted before, the distance of the nearest boundary point from the center of the rotor is (RS+RR−RF). While the rotor is revolving around the stator, the center of the rotor is orbiting around the center of the stator in a circle of radius RF. When the cardioid rotor's inflection point is closest to the center of the stator core, the rotor's center is diametrically opposite the center of the stator core from the inflection point by a distance of RF. This makes the closest approach of the rotor's inflection point to the center of the stator $RS+RR-2RF.$ Twice this value is the maximum "width" or minor axis dimension for the stator core:

$WSTATOR=2*(RS+RR-2RF)$

The actual minor axis length may be decreased below this at the expense of decreasing the engine's compression ratio and decreasing the space available for the cam and valve mechanism on the interior of the stator. For this reason, the maximum value given above was used for the illustrated embodiment. The stator width also represents the maximum practical diameter for the stator's supporting tunnel.

Given the values for LSTATOR and WSTATOR, the constants needed to draw the stator shape may be derived. A pair of arcs must be drawn connecting the endpoints indicated by LSTATOR while intersecting the points indicated by WSTATOR. To calculate the radius and angle of the arcs, first calculate the length of the chord subtending half of the arc:

$LCHORD=sqrt(square(LSTATOR/2)+square(WSTATOR/2))$

Half of the angle opposing this chord (in radians) is:

$ACHORD=(pi/2)-arctangent((LSTATOR/2)/(WSTATOR/2))$

The radius of the required arc is $RSTATOR=(LCHORD/2)/sin(ACHORD).$

The angle of the required arc is $ASTATOR=4*ACHORD$

The distance of the arc center points from the major axis along the minor axis is the difference between the radius of the arc and half the width of the stator core. With this information, the arcs can be drawn.

It is necessary to adhere closely to these proportions between the internal stator and its surrounding cardioid chamber proportions in order to sustain compression and operation of the engine. The inside dimensions of the cardioid are given above; to draw a larger cardioid around this (representing the outside of the combustion chamber wall), the static and rolling circle radii may be increased arbitrarily (maintaining the restriction that RR=RS), but the follower radius remains the same as that used for the inner cardioid above.

The cardioid combustion chamber is encircled by an eccentric gear whose radius RE must not be less than the distance of the outermost boundary point from the center of the cardioid, so $RE>=RS+RR+RF.$ The eccentric gear in turn revolves within the constraining "power band" of radius RP. These gears have the same relationship as the pinion and the ring gear in the classical rotary engine in that they differ in radius by the degree of eccentricity:

$RP=RE+RF$

The theoretical minimum eccentric gear radius RE is (RS+RR+RF), but this must be increased by the wall thickness of the combustion chamber and of the eccentric gear itself. The problem with increasing the radius of the eccentric gear arbitrarily is that the ratio of the radius of the eccentric gear to that of the power band is:

$RE/RP=RE/(RE+RF),$ which tends toward one as RE tends toward infinity. Eventually (when the length of the gear teeth approaches the radius of eccentricity RF), the teeth will remain partially meshed about the circumference of the gear, and eccentric motion will no longer be possible. For this reason, increasing the radius of the eccentric gear arbitrarily should be avoided. The rotational speed of the power band lags behind the speed of the eccentric gear by a factor of (RE/RP).

The external pinions shown in the illustrations of the inverted engine are one embodiment of a constraint mechanism that forces the revolving power band to remain coaxial with the center of the stator core. In this embodiment, the size of the pinions is not rigidly restricted. They must be of sufficient radius to support teeth approximating the size of the teeth in the power band, but small enough to avoid collision with the core tunnel that connects the stator core to the vehicle.

In the embodiment of the inverted engine illustrated in FIG. 1, the pinions (and their supports) have been placed in the interior of the power band to leave the outside circumference unencumbered by any engine parts, so that the engine may drive a circumferential load (specifically a load that is radially symmetrical about the engine, such as an automobile tire).

The rotating cardioid combustion chamber revolves about a stator core that is supported by a tunnel extending from the inboard and outboard sides of the constant-width stator core along a common axis. Like the uninverted Wankel engine, shaft seals are required in the sides of the rotating combustion chamber to allow the chamber to revolve eccentrically about the core tunnel that supports the stator core. There are actually two circular seals involved: one interfacing to the epitrochoid chamber, the other sealing around the core tunnel. The maximum radius of the outer seal is the minimum radius of the cardioid, LMINOR/2. This must be diminished slightly to allow for the radial thickness of the outer seal. The practical maximum outer diameter of the core tunnel is the width of the stator core. The inside diameter of the tunnel may be somewhat arbitrary, but must allow the walls of the core tunnel to be strong enough to support a portion of the mass of a vehicle.

Unlike the Wankel-type engine (with constant-width core), the shaft seals must bear the entire reaction force resulting from a combustion cycle. The effect of the expanding gases is to try to force the stator core into the center of the rotor and out of contact with the walls. This in turn tends to push the encompassing eccentric gear into the middle of the power band with its teeth disengaged. If the engine had a constant-width core, the enclosing rotor would accept reaction force from an explosion on one side of the stator core and reapply it as reaction force to the opposing side of the stator core. But with the cardioid geometry, the burden falls entirely on the shaft seals. The power band and pinions should be designed with sufficient clearance from the eccentric gear so that the power band only absorbs the tangential component, but never the radial component of the reaction force.

Like the Wankel engine, the combustion chamber seal is necessary to allow the chamber to withstand pressure. Unlike the Wankel engine, no mechanical energy needs to be transmitted from the inside of the combustion chamber to the outside through the chamber seals. One side effect of the external-pinion geometry is that the eccentric and pinion gears are not within the combustion chamber, where they would be exposed to high temperatures and its accompanying thermal fatigue.

In the inverted cardioid engine, the upper and lower chambers each arrive at both their maximum and minimum volumes once during each complete revolution of the rotor. Because it is a four-phase (or "four stroke") engine, two revolutions of the rotor are required for ignition to have occurred in each of the chambers. As a result, the engine averages one power stroke per revolution. However, the phases of the lower chamber 16 precede the phases of the upper chamber 15 by a full phase. A single operational phase of the cardioid engine is defined to be 90 degrees rotation of the cam shaft or 180 degrees rotation of the rotor.

| Phase | Upper chamber 15 | Lower chamber 16 |
| --- | --- | --- |
| 1 | intake | exhaust |
| 2 | compression | intake |
| 3 | combustion | compression |
| 4 | exhaust | combustion |

Alternatively, it's also possible to arrange the lower chamber 16 to lag behind the upper chamber 15. Either arrangement will give the single-rotor engine a "beat, beat, rest, rest" cadence with two consecutive combustion phases followed by two non-combustion phases.

In the inverted cardioid, the camshaft must turn at half the speed of the rotor, because the rotor requires two full revolutions for each chamber to pass through four cycles. As the rotor is turning clockwise, the contact point between the rotor and the power band is traversing counterclockwise by the same degree. The outboard shaft seal, whose center always lies toward the power band contact point from the center of the rotor, is traveling opposite the direction of the rotor. This shaft seal supports the ring gear that drives the cam shaft through a mechanism that reverses and reduces the rotational speed by a factor of 2. Therefore, the mechanism for synchronizing the cam shaft in both the Inverted Wankel and cardioid engines is the same with respect to the ratios of the various gears in the cam driver train.

In a single-rotor cardioid engine, the mass of the rotor is always eccentrically offset from the center of the stator core. If this is dynamically undesirable, a two-rotor engine may be employed, with the rotors diametrically opposed about the center of the stator core. With the rotors 180 degrees out of phase with each other, the rotor mass appears to be radially symmetrical about the stator core. This amount of phase difference is needed if the different segments of the power band are to be synchronized through transfer gears. This also has the happy harmonic side effect of giving the engine a more constant cadence.

The Inverted Wankel and the cardioid engine differ considerably in attainable compression ratios. In the Wankel-class engine, the maximum volume of a chamber at the start of the compression must be less than half of the volume of the rotor chamber. Specifically, it is half of the volume of the epitrochoid minus the area of a portion of the stator core that protrudes into that half of the epitrochoid. By contrast, at the beginning of a compression phase, the cardioid's major chamber will contain the entire volume of the cardioid less the volume of the stator core and the minor chamber volume. This is much more than half of the volume of the cardioid. The cardioid engine may have a substantially higher compression ratio than the Wankel-class engine. The engine could be further simplified if the compression ratio were sufficient to sustain Diesel operation, eliminating the need for spark plugs.

There are parts essential to the starting and operation of the engine that are not illustrated here. A starter and a generator may easily be mounted on one or the other pinion support, with an abundance of exposed teeth on the interior of the power band to engage the starter or generator gears. Alternatively, a multi-pole generator may be placed in the core tunnel, with permanent magnets orbiting about it. An epitrochoid pump chamber may revolve about the engine core along with the combustion chamber, driven by the power band. Such pump chambers and their associated stator cores could serve to pressurize fuel, oil, hydraulic or cooling fluids. There is ample space in the core tunnel for intake and exhaust manifolds. The air filter may be integrated into the hubcap.

Although a number of exemplary aspects and embodiments have been discussed above, those of skill in the art will recognize that there can be modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. An internal combustion engine comprising:
    (a) a support structure, including a tube;
    (b) a hollow stator core having exactly two curved surfaces that meet at acute angles, supported by and rigidly affixed to said tube;
    (c) a rotor assembly defining an interior space that is subdivided by the stator, eccentrically and rotatably mounted about said stator core and having a pair of partial sidewalls, each defining a circular opening;

(d) a pair of shaft seals each set into a said circular opening and rotatably mounted about said tube;

(e) said stator core, rotor and shaft seals together defining multiple, separate sealed chambers that change volume as said rotor moves; and (f) ignition, intake and exhaust mechanisms mounted internal to said hollow stator core.

2. The engine of claim 1, wherein said rotor assembly has an interior surface in the shape of a cardioid.

3. The engine of claim 1, in which a ring gear is mounted about and driven by said rotor and constrained by a positional constraint assembly.

4. The engine of claim 3, in which the outer perimeter of the ring gear is unencumbered by the engine mechanism and may be used to drive a circumferential load.

5. The engine of claim 1, in which said ignition, intake and exhaust mechanisms are driven by a set of cams mounted on a cam shaft.

6. The engine of claim 1, in which a ring gear or cog wheel is mounted on said shaft seal and said cog wheel drives a gear train that drives said cam shaft.

7. The engine of claim 1, in which all of said multiple chambers serve as combustion chambers.

8. The engine of claim 3, in which said constraint mechanism is a set of pinions rotatably mounted so as to engage and constrain said ring gear.

9. The engine of claim 3, in which said rotor has outwardly facing teeth on its radially exterior surface and said ring gear has inwardly facing teeth on its radially inward surface, and wherein said inwardly facing teeth mesh with said outwardly facing teeth.

10. An internal combustion engine comprising:

(a) support structure means, including tube means;

(b) stator core means core with exactly two curved surfaces that meet at acute angles, supported by and rigidly affixed to said tube means;

(c) rotor assembly defining an interior space that is subdivided by the stator, eccentrically and rotatably mounted about said stator core means and having a pair of partial sidewall means, defining a circular opening;

(d) a pair of shaft seal means each set into a said circular opening and rotatably mounted about said tube means;

(e) said stator core means, rotor means and shaft seal means together defining multiple chambers that change volume as said rotor means moves, at least one of said chambers being a combustion chamber; and (f) ignition, intake and exhaust means mounted internal to said hollow stator core means.

11. The engine of claim 10, in which ring gear means are mounted about and driven by said rotor means and constrained by positional constraint means.

12. The engine of claim 11, in which said rotor means has outwardly facing teeth means on its radially exterior surface and said ring gear has inwardly facing teeth means on its radially inward surface, and wherein said inwardly facing teeth means mesh with said outwardly facing teeth means, to drive said ring gear.

13. The engine of claim 10, in which an outer perimeter of said ring gear means is unencumbered by said engine and may be used to drive a circumferential load.

14. The engine of claim 10, in which said ignition, intake and exhaust mechanisms are driven by a set of cam means mounted on a cam shaft means.

15. The engine of claim 10, in which gear means are mounted on said shaft seal and said gear means drive a gear train means that drives said cam shaft means.

16. The engine of claim 10, in which all of said multiple chambers are combustion chambers.

17. The engine of claim 11, in which said constraint means is a set of pinion means rotatably mounted so as to engage and constrain said ring gear means.

\* \* \* \* \*